United States Patent [19]
Iwasaki et al.

[11] Patent Number: 6,064,552
[45] Date of Patent: May 16, 2000

[54] MAGNETORESISTIVE HEAD HAVING MAGNETIC YOKE AND GIANT MAGNETORESISTIVE ELEMENT SUCH THAT A FIRST ELECTRODE IS FORMED ON THE GIANT MAGNETORESISTIVE ELEMENT WHICH IN TURN IS FORMED ON THE MAGNETIC YOKE WHICH ACTS AS A SECOND ELECTRODE

[75] Inventors: Hitoshi Iwasaki, Yokosuka; Yuzo Kamiguchi; Masashi Sahashi, both of Yokohama; Hiroaki Yoda, Kawasaki, all of Japan

[73] Assignee: Kabushiki Kaisha Toshiba, Kawasaki, Japan

[21] Appl. No.: 09/042,696

[22] Filed: Mar. 17, 1998

[30] Foreign Application Priority Data

Mar. 18, 1997 [JP] Japan ...................................... 9-064474

[51] Int. Cl.⁷ ...................................................... G11B 5/39
[52] U.S. Cl. .......................................................... 360/113
[58] Field of Search ............................ 360/113; 324/252; 338/32 R

[56] References Cited

U.S. PATENT DOCUMENTS

| 5,508,868 | 4/1996 | Cheng et al. ............................ 360/113 |
| 5,627,704 | 5/1997 | Lederman et al. ....................... 360/113 |
| 5,668,688 | 9/1997 | Dykes et al. ............................. 360/113 |
| 5,726,837 | 3/1998 | Nakatani et al. ........................ 360/113 |
| 5,729,410 | 3/1998 | Fontana, Jr. et al. .................... 360/113 |
| 5,731,937 | 3/1998 | Yuan ........................................ 360/113 |
| 5,736,921 | 4/1998 | Maeda et al. ........................ 338/32 R |
| 5,751,521 | 5/1998 | Gill ......................................... 360/113 |
| 5,784,224 | 7/1998 | Rottmayer et al. ...................... 360/113 |
| 5,818,323 | 10/1998 | Maeda et al. ........................ 338/32 R |
| 5,894,384 | 4/1999 | Funayama et al. ...................... 360/113 |
| 5,909,344 | 6/1999 | Gill ......................................... 360/113 |
| 5,930,087 | 7/1999 | Brug et al. .............................. 360/113 |
| 5,966,274 | 10/1999 | Suzuki .................................... 360/113 |
| 5,973,889 | 10/1999 | Ruigrok .................................. 360/113 |

FOREIGN PATENT DOCUMENTS 872828 10/1998 European Pat. Off. .
8-138215 5/1996 Japan .

OTHER PUBLICATIONS

K. Yamada et al., "Fabrication Process for High Track Density Yoke MR Heads", IEEE Transactions on Magnetics, vol. 26, No. 5, pp. 2406–2408, Sep. 1990.

Primary Examiner—Jefferson Evans
Attorney, Agent, or Firm—Finnegan, Henderson, Farabow, Garrett & Dunner, L.L.P.

[57] ABSTRACT

A magnetoresistive head comprising, a magnetic yoke defining a magnetic gap for guiding signal magnetic fields from a recording medium at the air-bearing surface, a giant magnetoresistive element magnetically coupled with the magnetic yoke at a position remote from the air-bearing surface, and means for supplying a sense current in a direction substantially perpendicular to the surface of the giant magnetoresistive element.

37 Claims, 3 Drawing Sheets

MAGNETORESISTIVE HEAD HAVING MAGNETIC YOKE AND GIANT MAGNETORESISTIVE ELEMENT SUCH THAT A FIRST ELECTRODE IS FORMED ON THE GIANT MAGNETORESISTIVE ELEMENT WHICH IN TURN IS FORMED ON THE MAGNETIC YOKE WHICH ACTS AS A SECOND ELECTRODE

BACKGROUND OF THE INVENTION

This invention relates to a yoke type magnetoresistive head.

In a magnetic recording device such as a hard disk drive (HDD), a super high density recording of as high as 10 GB (gigabits) per square inch is now aimed at as the next target. For improvement of recording density of a recording medium, it is required to improve track density by making recording track width narrow and, at the same time, to improve linear density in the recording track direction. For read-out from a recording medium of narrow track width, a reproducing head of high sensitivity is required. In order to meet this requirement, use of a magnetic head utilizing a giant magnetoresistive effect, which can generate an extremely large rate of resistance change is more preferable rather than the conventional magnetic head utilizing an anisotropic magnetoresistance effect. Further, for read-out from a recording medium of high linear density, it is important to reduce head-medium spacing so as to realize an in-contact operation or a pseudo-contact operation, and also important to reduce reproducing gap length.

A shielded MR head is conventionally known. The shielded MR head is constructed such that a magnetoresistive element (MR element) is disposed near the air-bearing surface (ABS) of a head substrate which faces the recording medium, and magnetic shields are disposed to the both sides of the MR element. However, since a sense current is allowed to flow through the MR element, if the MR element is brought into contact with a recording medium, the MR element is electrically unstabilized and may be electrically broken down in the worst case. In addition, due to heat generated by contact with the recording medium, the temperature of the MR element may be raised, resulting in unstable head operation. Further, in the structure that the MR element is interposed between the magnetic shields, it is difficult to reduce gap length.

With a view to overcome the aforementioned problems, a yoke type MR head has been proposed (for example, IEEE Trans. Magn., Vol. MAG-26(1990)2406). This yoke type MR head comprises a magnetic yoke which is formed on a head substrate so as to define magnetic gap at the air-bearing surface, and a couple of MR elements which are electrically insulated from the magnetic yoke. The MR elements are designed to allow a sense current to pass along the film surface. Since the magnetic yoke is electrically insulated from the MR elements in this structure, even if the magnetic yoke is brought into contact with the recording medium, the MR elements would not be badly affected. Since the MR elements and electrodes need not to be disposed in the magnetic gap defined by the magnetic yoke, the gap length can be easily reduced.

On the other hand, since the reproducing sensitivity is greatly deteriorated if the MR elements are disposed remote from the air-bearing surface in this MR head, the MR elements are required to be disposed as close to ABS as possible in order to obtain a sufficient reproducing sensitivity. However, if a GMR element made of stacked metal films such as a spin valve is disposed close to a recording medium, it becomes difficult to ensure electric insulation against the magnetic yoke or to form electrodes.

BRIEF SUMMARY OF THE INVENTION

Accordingly, an object of the present invention is to provide a yoke type magnetoresistive head which is high in sensitivity and suited for effecting the incontact operation.

A magnetoresistive head according to the present invention comprises a magnetic yoke defining a magnetic gap at the air-bearing surface for guiding a signal magnetic field from a recording medium, a giant magnetoresistive element (GMR element) magnetically coupled with the magnetic yoke at a position remote from the air-bearing surface; and means for supplying a sense current in a direction perpendicular to a film surface of the magnetoresistive element.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
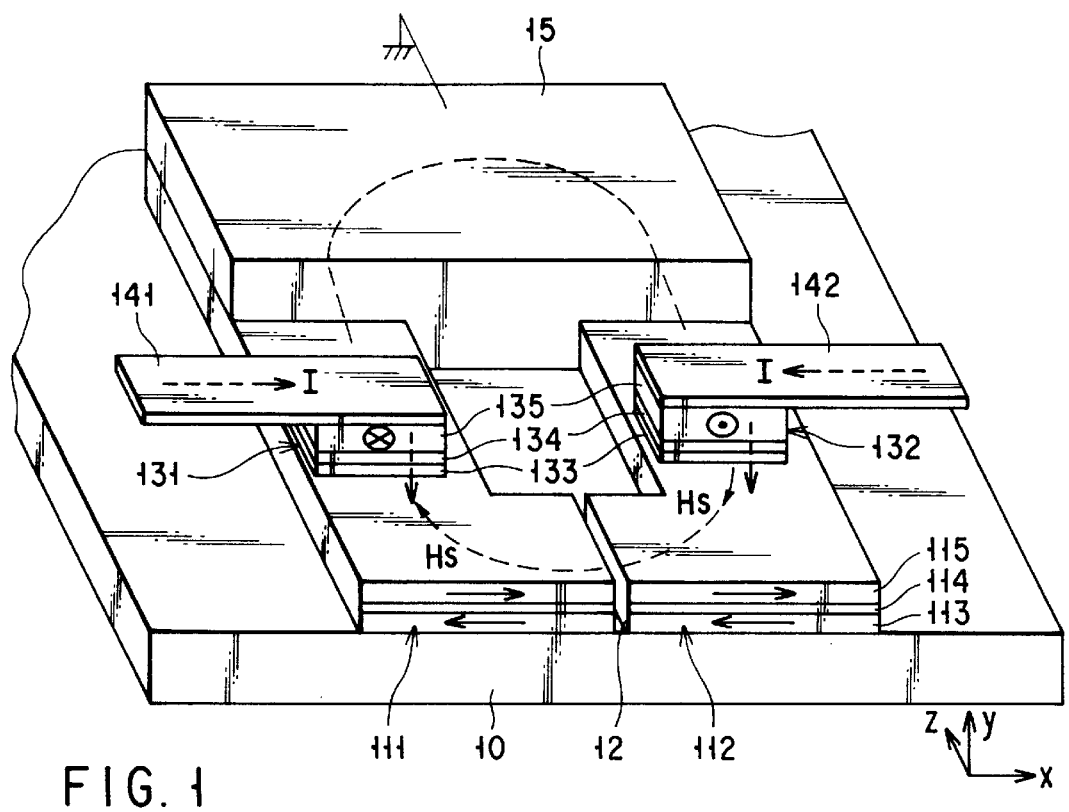
FIG. 1 is a perspective view of a magnetoresistive head in Example 1.

This invention will be further explained in detail with reference to the following preferred embodiments.

In the present invention, the magnetic yoke may be constituted by a single magnetic film. In this case, NiFe; an amorphous film such as and CoZrNb; a fine crystalline film such as FeTaN and FeHfC; and a soft magnetic film such as FeAlSi may be employed as a single magnetic film. However, the magnetic yoke should preferably have a stacked structure in which a magnetic layer having a thickness of 0.01 to 0.5 $\mu$m and a non-magnetic layer (such as Ta, Cr and AlN) having a thickness of 1 to 50 nm are alternately stacked with at least two magnetic layers being included. The magnetic yoke of such a stacked structure is easy in magnetic domain control and effective in suppressing Barkhausen noise.

A GMR element used in the present invention comprises a field detection layer (or region) and a magnetization fixed layer (or region) and utilizes resistance change by spin-dependent scattering. More specifically, it is preferable to employ a GMR element having a structure as explained below. One preferable embodiment of a GMR element has a stacked structure comprising a ferromagnetic layer (field detection layer or free layer) having a thickness of 1 to 200 nm, a high-resistance non-magnetic layer consisting of an insulator or a semiconductor having a thickness of 1 to 50 nm, and a ferromagnetic layer (magnetization fixed layer or pinned layer) having a thickness of 1 to 200 nm. Another preferable embodiment of a GMR element has a granular magnetic layer containing magnetic grains, made of Co, Fe, Ni or an alloy thereof, dispersed in a high-resistance non-magnetic matrix, made of an insulator or a semiconductor. In the granular magnetic layer, a region near one surface functions as a field detection region and a region near the other surface functions as a magnetization fixed region.

In order to fix magnetization of the ferromagnetic layer (pinned layer), an antiferromagnetic layer made of, for example, $Ir_{22}Mn_{78}$, CrMn or NiMn is stacked on the ferromagnetic layer. Specific examples of such a stacked structure are $Fe/Al_2O_3/Fe/IrMn$; $Co/Al_2O_3/Co/IrMn$; $Co/CoO/Co/IrMn$; $Co_{90}Fe_{10}/Al_2O_3/Co_{90}Fe_{10}/IrMn$; $Fe/Si/Fe/CrMn$, etc. It is also possible to employ a hard magnetic film such as CoPt as a pinned layer and omit the antiferromagnetic layer.

The GMR element having the above structure is highly resistant. Since the sense current is supplied in the direction perpendicular to the film surface of the GMR element in this invention, it is possible to obtain a relatively high resistance change by the employment of high-resistance GMR element and hence to expect a large reproducing output.

On the other hand, it is also known a GMR element such as a spin valve having a stacked structure of a ferromagnetic layer (free layer), a non-magnetic metal layer and a ferromagnetic layer (pinned layer). However, if all of the layers in the GMR element are made of metal, the resistance thereof would be extremely lowered as a sense current is supplied in a direction perpendicular to the film surface. Therefore, even if the rate of resistance change is large in such a GMR element, only a small reproducing output could be obtained.

In the GMR element having a stacked structure of a free layer, a high-resistance non-magnetic layer and a pinned layer, the free layer may be directly formed on the surface of the magnetic yoke so as to cause exchange coupling. Alternatively, the free layer may be formed on the magnetic yoke with interposing an insulator so as to cause magnetostatic coupling. Note that, the GMR element may have a structure that a high-resistance non-magnetic layer and a pinned layer are stacked on the magnetic yoke so as to make the magnetic yoke function as a free layer. The magnetization direction of the pinned layer should preferably be fixed approximately parallel or antiparallel with the direction of the signal magnetic field introduced into the magnetic yoke at a position where the GMR element and the magnetic yoke are magnetically coupled. In this GMR element, when the magnetization of the magnetic yoke is rotated due to the signal magnetic field, the magnetization of the free layer is also rotated in the same direction as the magnetization direction of the magnetic yoke. As a result, the angle between the magnetization directions of the free layer and pinned layer is caused to change according to the change in magnetization direction of the magnetic yoke, resulting in a change in resistance accompanying with a spin-dependent scattering.

A GMR element having a granular magnetic film is constructed by, for example, forming the granular magnetic film on a magnetic yoke so as to cause magnetic coupling, and forming a magnetization fixed layer (pinned layer) and an antiferromagnetic layer on the granular magnetic film. The magnetization of magnetic grains in a region (magnetization fixed region) of the granular magnetic film near the pinned layer is substantially aligned to the magnetization direction of the pinned layer. On the other hand, the magnetization of magnetic grains in a region (field detection region) of the granular magnetic film near the magnetic yoke is magnetically coupled with the magnetic yoke. In this GMR element, when the magnetization of the magnetic yoke is rotated due to the signal magnetic field, the magnetization of the magnetic grains in the granular magnetic film near the magnetic yoke is also rotated in the same direction as the magnetization direction of the magnetic yoke. As a result, the angle between the magnetization directions of the magnetic grains neighboring to each other along the thickness direction of the granular magnetic film is caused to change according to the change in magnetization direction of the magnetic yoke, resulting in a change in resistance accompanying with a spin-dependent scattering.

In the present invention, an electrode is formed on the GMR element to supply a sense current to the GMR element. The sense current is allowed to flow in a direction perpendicular to the surface of the GMR element and then to the magnetic yoke. In such a construction, since the magnetic yoke can be set to the ground potential, stable reproducing operation can be realized even if the magnetic yoke comes into contact with the medium.

The magnetoresistive head according to this invention may be constructed in such a manner that the thickness direction of the magnetic yoke is approximately the same as the track direction, or in such a manner that the thickness direction of the magnetic yoke is approximately the same as the track width direction.

The MR head in which the thickness direction of the magnetic yoke agrees with the track direction may be constructed as explained below. Namely, a magnetic yoke having a thickness of 0.01 to 0.1 µm is disposed to the central portion of the MR head. A GMR element is formed on the magnetic yoke, with being magnetically coupled with the magnetic yoke, at a position remote from the air-bearing surface. A couple of magnetic gap films are formed on the top and bottom of the magnetic yoke and the GMR element in the central portion. Further, a couple of magnetic yokes each having a thickness of 0.5 to 3 µm are formed on the top and bottom of the magnetic gap films. In practice, on a head substrate, there are successively stacked along the track direction an outer magnetic yoke, a magnetic gap film, a central magnetic yoke, a GMR element, a magnetic gap film and an outer magnetic yoke. The couple of outer magnetic yokes are disposed in a manner to enclose the central magnetic yoke which is magnetically coupled with the GMR element, so that these outer magnetic yokes function also as magnetic shields against the external noise magnetic field. As mentioned above, the magnetic yoke coupled with the GMR element should preferably be thinner than the outer magnetic yokes. If the central magnetic yoke is made thinner, the signal magnetic flux density inside the magnetic yoke becomes higher so that the magnetization rotation of the GMR element coupled with the magnetic yoke can be effectively induced, whereby making it possible to reproduce recording in high sensitivity. Further, since magnetic yokes are mounted on the top and bottom of the magnetic gap film, the gap length can be easily reduced by reducing the thickness of the magnetic gap film.

The MR head in which the thickness direction of the magnetic yoke agrees with the track width direction, a couple of magnetic yokes are flatly disposed on both sides of the magnetic gap. It is possible according to the structure to make the thickness of the magnetic yoke thinner than the track width, so that an MR head suitable for reproduction from a medium having a narrow track width can be easily manufactured.

In the present invention, it is preferable to employ two units of GMR elements, and to allow the GMR elements to be magnetically coupled with the magnetic yoke at two positions where the directions of the signal magnetic field introduced into the magnetic yoke become opposite with each other.

An MR head in which the directions of magnetization of the magnetization fixed layers (pinned layers) of two units of GMR elements are made opposite to each other will be explained. In this case, when a signal magnetic field is applied to two units of GMR elements in opposite directions to each other, resistance changes are superimposed, thus making it possible to obtain a large reproducing output. On the other hand, when an external noise magnetic field is applied to two units of GMR elements in the same direction, resistance changes are compensated, so that the noise magnetic field cannot be detected. As a result, it is possible to obtain a reproducing output excellent in S/N ratio.

An MR head in which the directions of magnetization of the magnetization fixed layers (pinned layers) of two units of GMR elements are set to the same direction will be explained. In this case, a differential amplifier is connected to the output terminals of two units of GMR elements, and only the output sign of one of the GMR elements is reversed and then the resultant output is superimposed on the output of the other GMR element. When a signal magnetic field is applied to two units of GMR elements in opposite directions to each other, resistance changes are superimposed due to the differential amplifier circuit, so that it is possible to obtain a large reproducing output. On the other hand, when an external noise magnetic field is applied to two units of GMR elements in the same direction, resistance changes are compensated by the differential amplifier circuit, so that the noise magnetic field cannot be detected. As a result, it is possible to obtain a reproducing output excellent in S/N ratio.

EXAMPLES

Specific examples of this invention will be explained as follows.

Example 1

FIG. 1 shows a perspective view of a magnetoresistive head of this example as it is viewed from the ABS side. In this MR head, the thickness direction of the magnetic yoke is made to agree with the track width direction substantially.

A pair of front yokes 111 and 112 are formed on a substrate 10 so as to define a magnetic gap 12. These front yokes 111 and 112 have a structure in which a ferromagnetic layer 113, a non-magnetic layer 114 and a ferromagnetic layer 115 are stacked. It is possible with this stacked structure to suppress an increase of demagnetizing field even if the front yoke is miniaturized, so that magnetic domain would be hardly generated in the front yoke and hence Barkhausen noise can be suppressed. Ferromagnetic layers 113 and 115 constituting the front yokes 111 and 112 are provided with a magnetic anisotropy along the recording track direction of recording medium as indicated in FIG. 1 by the arrow lines(the x-direction in FIG. 1). By providing a magnetic anisotropy into the ferromagnetic layers 113 and 115 in this manner, a medium magnetic field can be effectively introduced into the front yoke. The thickness of front yokes 111 and 112 (along the y-direction in FIG. 1) is adjusted to be not larger than the recording track width, i.e., in the order of submicron.

GMR elements 131 and 132 magnetically coupled with the front yokes 111 and 112 are formed at positions set back from the air-bearing surface. Each of the GMR elements 131 and 132 is formed of a stacked structure of a free layer 133/a non-magnetic layer 134/a pinned layer 135/a protective layer (omitted in FIG. 1). A thick rear yoke 15 in contact with the upper surface of the front yokes 111 and 112 so as to cause magnetic coupling with each other is formed at a position further set back from the ABS than the GMR elements 131 and 132. By making the rear yoke 15 relatively thick, the efficiency of the magnetic circuit can be improved. Electrodes 141 and 142 for supplying a sense current are formed on the GMR elements 131 and 132. An electrode terminal is also formed on the rear yoke 15 which is grounded. When the rear yoke 15 is grounded in this manner, the front yokes 111 and 112 are also set to nearly ground potential. Although not shown in the FIG. 1, a magnetic pole of the recording head is stacked on the reproducing head. Note that, a recording coil may be formed to the rear yoke 15 so as to manufacture an integrated recording/reproducing magnetic head.

In the magnetoresistive head, a sense current is supplied from each electrode through the GMR element, the front yoke and the rear yoke to the ground electrode terminal (see dashed line shown in FIG. 1). In this manner, the sense current is supplied in the direction perpendicular to the film surface of the GMR elements 131 and 132. Since the front yokes 111 and 112 can be set at ground potential according to this structure, there is no possibility of the GMR element being electrically broken down, even if the front yoke is happened to be brought into contact with the recording medium.

Reproducing can be performed by the following principle according to the magnetoresistive head.

The medium magnetic field Hs guided from the gap 12 is orientated in the opposite directions to each other (opposite by an angle of 180 degrees) in each of the front yokes 111 and 112. In conformity with this orientation, the magnetization directions of the pinned layers 135 of two units of the GMR elements 131 and 132 are fixed in the opposite directions to each other (opposite by an angle of 180 degrees) along the direction (z-direction in FIG. 1) of the medium magnetic field at the front yokes 111 and 112. The free layers 133 of two units of the GMR elements 131 and 132 are magnetically coupled with the front yokes 111 and 112, so that the magnetization directions of the free layers 133 are almost the same as those of the front yokes 111 and 112. When the magnetizations of the front yokes 111 and 112 are rotated due to the magnetic field of recording medium, the magnetizations of the free layers 133 are also rotated following the front yokes 111 and 112. As a result, the angle between magnetization directions of the pinned layer 135 and the free layer 133 is caused to change, and hence the resistance of GMR elements 131 and 132 is also changed, whereby a signal is detected.

Since two units of GMR elements are employed in the magnetoresistive head shown in FIG. 1, a large reproducing output can be obtained as explained below.

When the medium magnetic field is introduced into the front yokes 111 and 112, the magnetization directions of the front yokes 111 and 112 are rotated in the opposite directions at the positions where each of the GMR elements is stacked. The magnetization directions of the pinned layers 135 of the GMR elements are orientated opposite to each other by an angle of 180 degrees. As a result, the resistance change to the medium magnetic field is increased (or decreased) in both of the GMR elements. Therefore, the resistance changes are superimposed, and hence a large reproducing output can be obtained. On the other hand, when an external noise magnetic field is applied, the magnetization directions of the front yokes 111 and 112 are rotated in the same direction. However, the magnetization directions of the pinned layers 135 of the GMR elements are orientated opposite to each other by an angle of 180 degrees. Therefore, one of the GMR elements would indicate an increased resistance change against the noise magnetic field, whereas the other GMR element would indicate a decreased resistance change. As a result, the noise magnetic field cannot be detected as a whole.

Next, the method of manufacturing the magnetoresistive head shown in FIG. 1 will be explained as follows.

The front yoke and the gap film can be formed as follows. First, a ferromagnetic layer, a non-magnetic layer and a ferromagnetic layer constituting the front yoke are formed on the head substrate. At this step, an induced magnetic anisotropy is introduced into the ferromagnetic layers by depositing these layers in a magnetic field. As the ferromagnetic layer, an NiFe alloy; a Co-based amorphous alloy such as a CoZrNb alloy; and a nitride such as FeTaN can be employed. The stacked film is then etched into a desired configuration by means of ion milling, reactive ion etching (RIE), or focused ion beam (FIB) to form front yokes. Then, an insulator such as SiOx is deposited to form a gap film with burying the gap between the front yokes by making use of a method excellent in directivity such as collimation sputtering. SiOx is also deposited in a region other than the gap region. Then, by means of etch-back or lapping, the gap film and the front yoke are flattened to reduce the thickness to less than the recording track width. By employing these processes, a front yoke suitable for a narrow track width can be easily formed.

Alternatively, the gap film may be formed by means of sputtering, and the region for forming the front yoke is etched away by means of RIE, after which a film for front yoke is deposited, etched into a desired configuration and flattened, thus forming the front yoke. As another method, one of the front yokes is deposited at first and then processed into a desired configuration, after which the gap film is deposited and then processed into a desired configuration, and the remaining front yokes is deposited and then processed into a desired configuration, and finally they are flattened. When the latter method is adopted, however, the gap plane may be slightly inclined in relative to the track width direction.

In the formation of the GMR element, a free layer, a non-magnetic layer, a pinned layer and a protective layer are successively deposited, and then the resultant stack is etched into a desired configuration by means of ion milling, for instance. As for the free layer and the pinned layer, a simple substance such as Co, Ni or Fe, or an alloy containing any of these metals as a main component may be employed. For example, CoFe, NiFe, Fe, NiFeCo, CoNi, and Co may be employed. As for the non-magnetic layer, a semiconductor such as Si; an insulator such as $Al_2O_3$; or an oxide of a magnetic material constituting the free layer or the pinned layer may be employed. As the protective film, Ta, Ti, Nb, Mo, etc., may be employed. If the front yoke is employed as a free layer of the GMR element, no free layer may be required to form separately.

The rear yoke should preferably be formed by means of lift-off or plating. If the rear yoke is to be processed by means, for example, of ion milling, the GMR element may be damaged when the rear yoke is over-etched. As the material for rear yoke, use is made of an NiFe alloy, an amorphous alloy, or a soft magnetic film such as a microcrystalline film containing Fe and Co as a main component and containing nitrogen, carbon or oxygen as other component.

The electrode for supplying a sense current to the GMR element, and the grounded electrode terminal to be connected with the rear yoke can be formed as follows. First, an insulating film such as SiOx is formed so as to cover the GMR element and the rear yoke. Then, contact holes are formed selectively at portions of the insulating film where terminals for the GMR element and the rear yoke are to be formed. Thereafter, an electrode material such as Ta/Cu/Ta is sputtered thereby filling these contact holes with the electrode material. Then, the electrode material thus deposited is processed by means of ion milling, for instance, thereby forming electrodes. Note that, the rear yoke may be formed before the GMR element is formed.

In the foregoing explanation, the GMR elements are formed on the pair of front yokes, respectively. However, the GMR element may be formed only on one of the pair of front yokes. In this case, the GMR and the yoke are required to be magnetically shielded in order to prevent the external noise magnetic field. A part of the magnetic shield may be constituted by a magnetic pole of a recording head formed on the reproducing head.

Example 2

Figure 2:
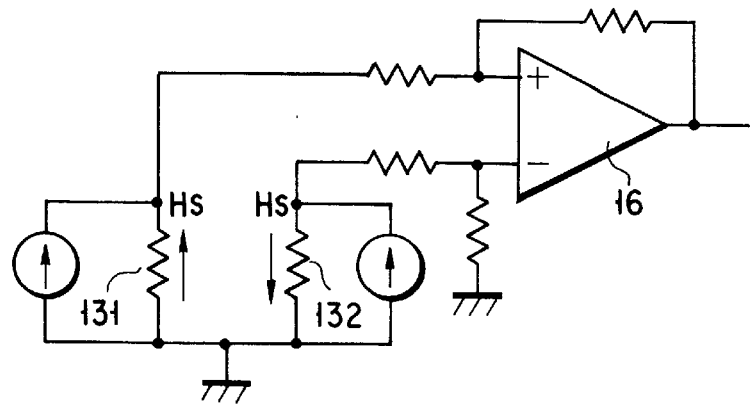
FIG. 2 is a diagram of a detection circuit containing a differential amplifier in Example 2.

In Example 1 (FIG. 1), the magnetization directions of the pinned layers of two units of the GMR elements 131 and 132 are fixed in the opposite directions to each other. However, the magnetization directions of the pinned layers of two units of the GMR elements 131 and 132 are fixed in the same direction with each other. In this case, as shown in FIG. 2, a differential amplifier 16 is connected to the output terminals of two units of GMR elements 131 and 132, and only the sign of output of one GMR element 132 is reversed and then the resultant output is superimposed on the output of the other GMR element 131.

As explained with reference to Example 1, when a medium magnetic field is introduced into the front yokes 111 and 112, the magnetizations of the front yokes 111 and 112 are rotated in the opposite directions at the positions where the GMR elements are stacked. If the magnetization directions of the pinned layers of these GMR elements 131 and 132 are oriented in the same direction with each other, the increase or decrease of the resistance change is reversed in each of the GMR element. In this case, if only the sign of output of one GMR element 132 is reversed by the differential amplifier 16 and then the resultant output is superimposed on the output of the other GMR element 131, it is possible to obtain a large reproducing output. On the other hand, against the external noise magnetic field, resistance changes in two units of the GMR elements can be compensated, so that the noise magnetic field is not detected. As a result, it possible to realize a high reproducing output excellent in S/N ratio.

Example 3

Figure 3:
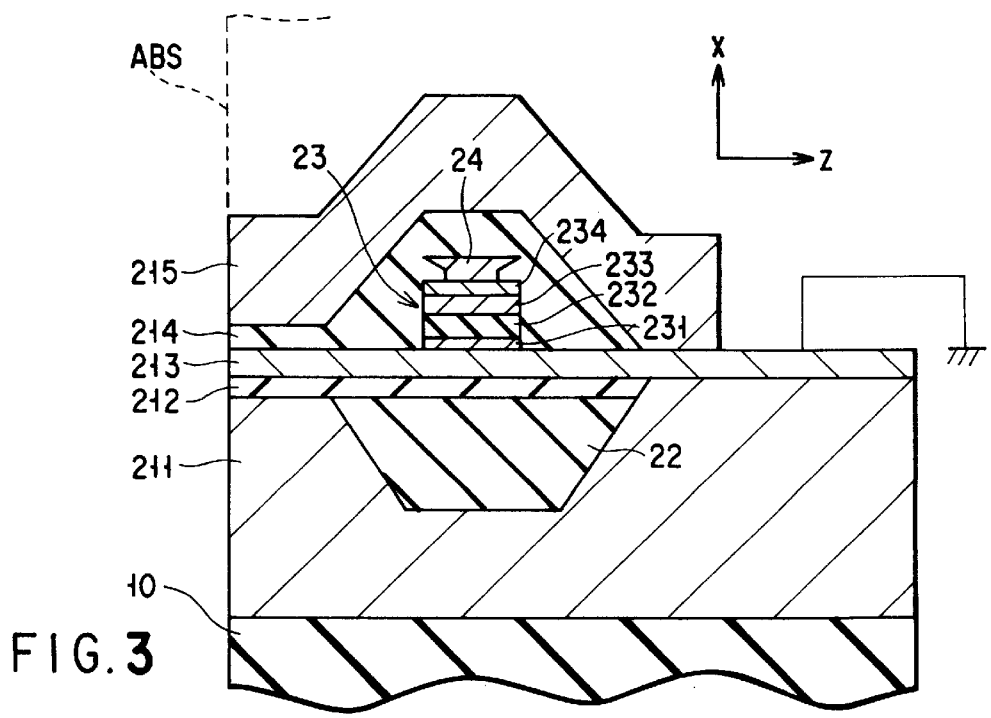
FIG. 3 is a cross-sectional view of a magnetoresistive head in Example 3.

FIG. 3 shows a cross-sectional view of a magnetoresistive head of this example. FIG. 3 illustrates a cross-section taken along the recording track direction (x-direction) and the direction (z-direction) which is perpendicular to the surface of recording medium. In this MR head, the thickness direction of the magnetic yoke is made to substantially agree with the track direction.

A first magnetic yoke 211 consisting of NiFe or amorphous CoZrNb is formed on a substrate 10. A portion of this first magnetic yoke 211 is etched away to form a trench, in which an insulator 22 is filled. A lower magnetic gap film 212 consisting of non-magnetic conductor such as Ta or Cr and having a thickness of 0.01 to 0.1 μm is formed on the ABS side of the first magnetic yoke 211 and on the upper surface of insulator 22. A second magnetic yoke 213 having a thickness of 0.01 to 0.2 μm is formed on the lower magnetic gap film 212 and on a portion of the first magnetic yoke 211 set back from ABS. Since the first and second magnetic yokes 211 and 213 are directly in contact with each other at a portion remote from ABS, the efficiency of magnetic circuit can be improved. A GMR element 23 is formed on the second magnetic yoke 213 and over the insulating layer 22. The GMR element 23 is formed of a stack comprising a free layer 231/a non-magnetic layer 232 (consisting of high-resistance semiconductor or insulator)/a pinned layer 233/a protective layer 234. Since the lower magnetic gap film 212 and the insulating layer 22 are disposed below a portion of the second magnetic yoke 213 where the GMR element 23 is in contact with, the medium magnetic field can be effectively introduced into the GMR element. An electrode 24 is formed on the GMR element 23. An upper magnetic gap film 214 having a thickness of 0.01 to 0.1 μm is formed so as to cover the GMR element 23, the electrode 24 and a portion of the second magnetic yoke 213 which is set back from ABS. It is essential for the upper magnetic gap film 214 to be constituted by a magnetical and electrical insulator in a portion near the GMR element. However, the upper magnetic gap film 214 may be formed of a conductive material in a portion near ABS. Further, a third magnetic yoke 215 is formed so as to cover the upper magnetic gap film 214 and a portion of the second magnetic yoke 213 set back from ABS. Although not shown in this FIG. 3, a recording head is stacked on the reproducing head.

In the magnetoresistive head, the sense current is supplied from the electrode 24 through the GMR element 23 in the direction perpendicular to the film surface to the second magnetic yoke 213 set to the ground potential. Accordingly, even if the head is brought into contact with the recording medium, it is possible to realize a stable reproducing operation. In this magnetoresistive head also, the signal magnetic flux intercepted by the magnetic yoke 213 is introduced into the magnetic circuit constituted by the magnetic yokes 211 and 215, and then transmitted effectively to the free layer 231 of the GMR element in contact with the magnetic yoke 213 thereby to perform reproducing. As mentioned above, it is possible to easily reduce the gap length by reducing the thickness of the lower magnetic gap film 212, the second magnetic yoke 213 and the upper magnetic gap film 214.

In FIG. 3, if the magnetic yoke 213 is employed as a free layer of the GMR element, the free layer may not be required to form separately.

Example 4

Figure 4A:
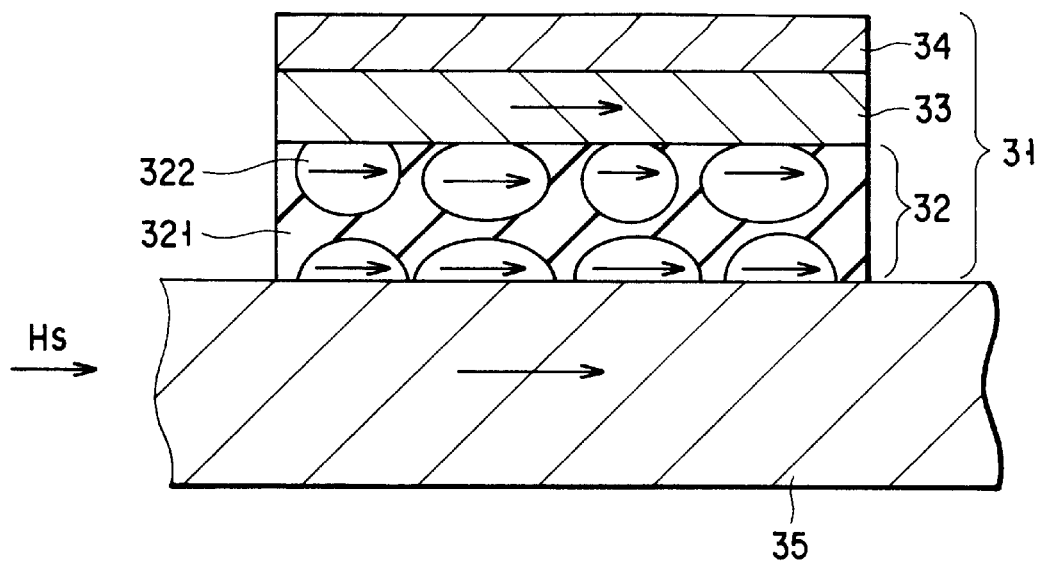
FIGS. 4A and 4B are cross-sectional views showing magnetization directions of a magnetoresistive head comprising a granular magnetic film in Example 4, when the direction of signal magnetic field is aligned to one direction and to the reverse direction.
Figure 4B:
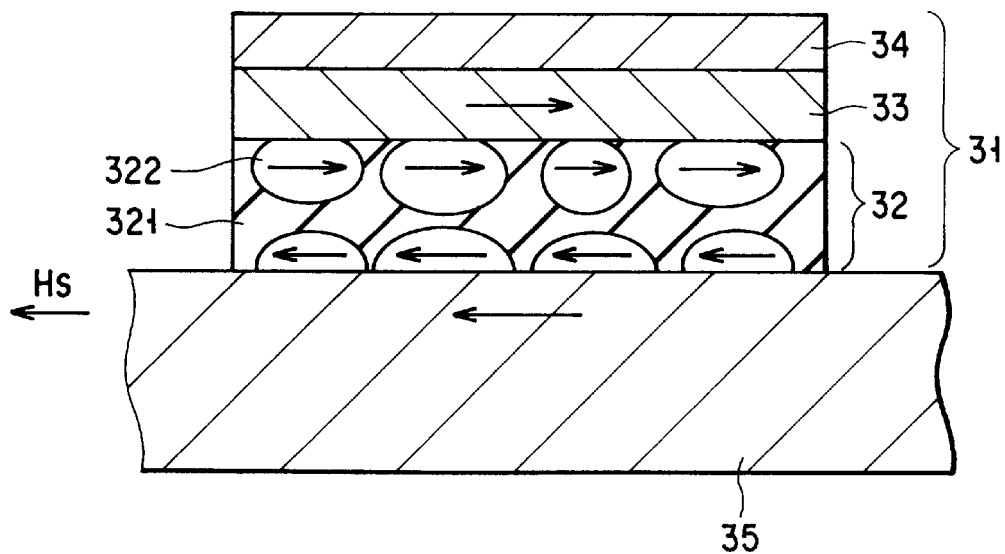

Modified embodiments of each GMR element shown in FIGS. 1 and 3 will be explained with reference to FIGS. 4A and 4B. FIGS. 4A and 4B illustrate respectively a structure wherein a granular GMR element is formed on a magnetic yoke.

Referring to FIGS. 4A and 4B, the GMR element 31 is formed of a stack comprising a granular magnetic film 32 having a thickness of 1 to 100 nm, a ferromagnetic layer (pinned layer) 33 having a thickness of 1 to 20 nm of which magnetization is fixed, an antiferromagnetic layer 34 having a thickness of 3 to 50 nm and a protective layer (not shown) having a thickness of 1 to 50 nm. The GMR element 31 is stacked on the magnetic yoke 35 so as to be magnetically coupled with each other. Additional ferromagnetic layer may be interposed between the granular magnetic film 32 and the magnetic yoke 35 in order to stabilize the magnetic coupling. The granular magnetic film 32 comprises magnetic grains 322 having an average grain size of 20 nm or less and being dispersed in a non-magnetic matrix 321 made of an insulator or a semiconductor.

The magnetic grains 322 may be formed of a simple substance such as Co, Ni or Fe; or an alloy containing any of these metals. The anti-ferromagnetic layer 34 may be formed of IrMn, FeMn or CrMn. The magnetization of the pinned layer 33 is fixed by the anti-ferromagnetic layer 34. It is also possible to employ a hard magnetic film such as CoPt as the pinned layer 33 and to omit the anti-ferromagnetic layer 34. The protective layer not shown is formed of a conductive film made of Ta, Zr, Ti, etc.

The magnetic grains constituting the granular magnetic film may be paramagnetic when the external magnetic field is almost zero. However, the magnetic grains should preferably be made ferromagnetic by dispersing in a non-magnetic matrix so as to act weak exchange coupling between the magnetic grains. Such a granular magnetic film can be obtained by cosputtering target of a non-magnetic matrix material and a target of a magnetic material. A preferable example of material for the granular magnetic film is Co/Al—O. The pinned layer 33 should preferably be magnetized in a direction substantially perpendicular to the magnetization direction of the magnetic yoke 35 when a signal magnetic field is not introduced (or in a direction substantially parallel or antiparallel with the signal magnetic field to be introduced into the magnetic yoke).

The magnetization of the magnetic grains in a region (field detection region) of the granular magnetic film 32 near the magnetic yoke 35 can be easily oriented in the same direction with the magnetization direction of the magnetic yoke 35, while the magnetization of the magnetic grains in a region (magnetization fixed region) near the magnetization fixed layer 33 can be easily oriented in the same direction with the magnetization direction of the magnetization fixed layer 33.

As a result, when the signal magnetic field is almost zero, the magnetization direction of the magnetic grains near the magnetic yoke 35 and the that of the magnetic grains near the magnetization fixed layer 33 are substantially normal with each other.

The magnetization direction of the magnetic grains in the granular magnetic film 32 in the two regions, i.e., near the pinned layer 33 and near the magnetic yoke 35, at the time when a signal magnetic field is introduced into the magnetic yoke 35 under the aforementioned conditions can be illustrated as follows. Namely, when a signal magnetic field oriented in the same direction as the magnetization direction of the pinned layer 33 (referred to as a positive signal magnetic field) is introduced into the magnetic yoke 35 as shown in FIG. 4A, the magnetization directions in the aforementioned two regions become parallel with each other. On the contrary, when a signal magnetic field oriented in the opposite direction to the magnetization direction of the pinned layer 33 (referred to as a negative signal magnetic field) is introduced into the magnetic yoke 35 as shown in FIG. 4B, the magnetization directions in the aforementioned two regions become antiparallel with each other. As a result, a linear response can be obtained in accordance with the signal magnetic field, and hence a reproducing signal which is substantially free from distortion and excellent in SN ratio can be obtained.

Example 5

Figure 5A:
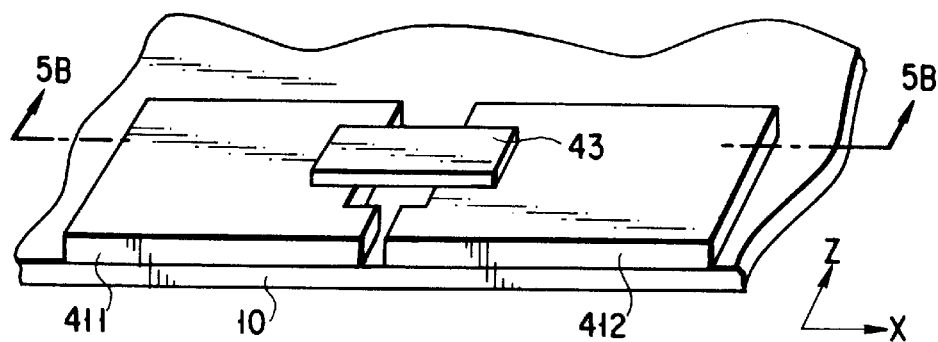
FIGS. 5A and 5B show a perspective view and a cross-sectional view of a magnetoresistive head in Example 5.
Figure 5B:
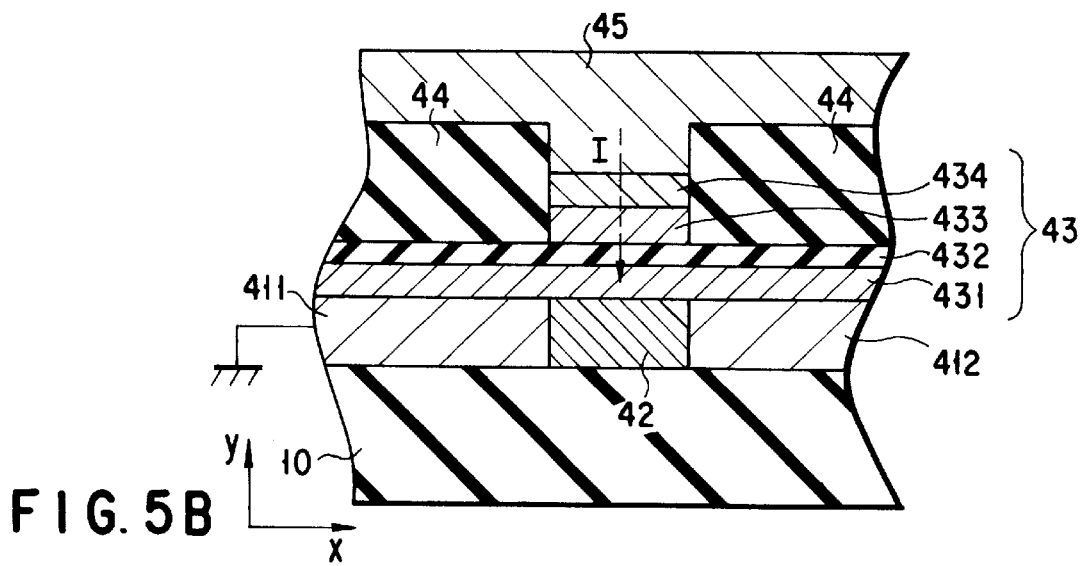

FIGS. 5A and 5B show another embodiment of this invention. As shown in FIG. 5A, two magnetic yokes 411 and 412 defining a magnetic gap at the air-bearing surface are formed in such a manner that the thickness direction thereof agrees with the track width direction. These magnetic yokes 411 and 412 are magnetically coupled with the GMR element 43 at a position remote from the air-bearing surface, thereby forming a magnetic circuit.

FIG. 5B illustrates the GMR element 43 and the magnetic yoke in detail. FIG. 5B is a cross-sectional view taken along the line 5B—5B of FIG. 5A. The gap between the magnetic yokes 411 and 412 is buried with a magnetic insulator (such as Ta) 42, thus forming a magnetic gap. On these members, the GMR element 43 comprising a free layer 431, a non-magnetic layer 432, a pinned layer 433 and an antiferromagnetic layer 434 is formed.

The free layer 432 extends so as to be in contact with the upper surfaces of the magnetic yokes 411 and 412 with bridging the magnetic insulator 42. An insulating layer 44 is formed on the free layer 432, of which portion corresponding to the magnetic gap is etched to form a trench. The pinned layer 433 is filled in the trench formed in the insulating layer 44, so that the width thereof is substantially identical with the magnetic gap length. The antiferromagnetic layer 434 is formed on the pinned layer 433. The electrode 45 is formed on the upper surface of the GMR element 43. The magnetic yokes 411 and 412 function as another electrodes and are set to the ground potential. A sense current is allowed to flow from the electrode 45 through the GMR element 43 in a direction perpendicular to the surface thereof to the magnetic yokes 411 and 412 which are set to the ground potential. In order to lower the resistance of the electrode portion of the GMR element 43, the magnetic insulator 42 should preferably be formed of a metal of low electric resistivity.

The free layer 431 is provided with an easy axis of magnetization in the z-direction, so that when the signal magnetic field is zero, the magnetization direction of the free layer 431 is orientated in the z-direction. The magnetization of the pinned layer 433 is fixed in the track direction (x-direction in FIG. 5B) by the antiferromagnetic layer 434. This direction is parallel or antiparallel with the direction of a signal magnetic field which is introduced via the magnetic yokes 411 and 412 into the free layer 431 of the GMR element 43. Therefore, when a signal magnetic field whose magnetization direction is the same as that of the pinned layer 433 is introduced, the resistance of the GMR element is reduced. On the contrary, when a signal magnetic field whose magnetization direction is the opposite to that of the pinned layer 433 is introduced, the resistance of the GMR element is increased. As a result, the signal magnetic field can be reproduced.

In the embodiment shown in FIGS. 5A and 5B, the free layer 431 is directly formed on the magnetic yokes 411 and 412 so as to cause exchange coupling. However, an electric insulating layer may be interposed between the free layer 431 and the magnetic yokes 411 and 412, so as to cause magnetostatic coupling. In order to set the free layer to the ground potential, an electrode need to be connected with the free layer 431. In this case, since a sense current is not allowed to flow into the magnetic yokes 411 and 412, it is possible to obtain an extremely stable in-contact operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A magnetoresistive head comprising:
   a magnetic yoke defining a magnetic gap for guiding a signal magnetic field from a recording medium at an air-bearing surface;
   a giant magnetoresistive element formed on said magnetic yoke and magnetically coupled with said magnetic yoke at a position remote from the air-bearing surface; and
   electrodes for supplying a sense current in a direction perpendicular to a film surface of said giant magnetoresistive element, one of said electrodes being formed on said giant magnetoresistive element and another of said electrodes consisting of said magnetic yoke.

2. The magnetoresistive head according to claim 1, wherein said giant magnetoresistive element having a stacked structure of a field detection layer, a non-magnetic layer and a magnetization fixed layer.

3. The magnetoresistive head according to claim 2, wherein said non-magnetic layer is made of a semiconductor or an insulator.

4. The magnetoresistive head according to claim 2, wherein an antiferromagnetic layer is formed on the magnetization fixed layer.

5. The magnetoresistive head according to claim 2, wherein an insulator is formed on said magnetic yoke and wherein said field detection layer is formed on said insulator so as to cause magnetostatic coupling with the magnetic yoke.

6. The magnetoresistive head according to claim 2, wherein said field detection layer is formed directly on the magnetic yoke so as to cause exchange coupling with the magnetic yoke.

7. The magnetoresistive head according to claim 2, wherein the non-magnetic layer and the magnetization fixed layer are formed on the magnetic yoke, and the magnetic yoke functions as the field detection layer.

8. The magnetoresistive head according to claim 1, wherein a thickness direction of said magnetic yoke is substantially the same as the recording track width direction of a recording medium.

9. The magnetoresistive head according to claim 1, comprising two units of giant magnetoresistive elements, said two units of giant magnetoresistive elements being magnetically coupled with the magnetic yoke at two positions where the directions of a signal magnetic field introduced into the two units are different with each other.

10. The magnetoresistive head according to claim 9, wherein the two units of giant magnetoresistive elements are magnetically coupled with the magnetic yoke at two positions where the directions of a signal magnetic field introduced into the two units are substantially opposite with each other.

11. The magnetoresistive head according to claim 9, wherein the directions of fixed magnetization in the two units of giant magnetoresistive elements are substantially opposite directions with each other.

12. The magnetoresistive head according to claim 9, wherein the directions of fixed magnetization in the two units of giant magnetoresistive elements are substantially the same directions with each other.

13. The magnetoresistive head according to claim 12, further comprising means for differentially detecting the outputs of the two units of giant magnetoresistive elements.

14. The magnetoresistive head according to claim 9, further comprising an electrical differential amplifier circuit for detecting the outputs of the two units of giant magnetoresistive elements.

15. The magnetoresistive head according to claim 1, wherein said sense current is allowed to flow from said giant magnetoresistive element to the magnetic yoke, and the magnetic yoke is set to the ground potential.

16. The magnetoresistive head according to claim 1, wherein said magnetic yoke comprising:
    a major surface substantially forming a single plane and comprising a first magnetic yoke member, a second magnetic yoke member, and a magnetic gap located between said first and second magnetic yoke members; and
    a medium facing surface substantially perpendicular to and adjacent to said major surface and containing said first magnetic yoke member, said second magnetic yoke member and said magnetic gap.

17. The magnetoresistive head according to claim 16, wherein said first magnetic yoke member and said second magnetic yoke member have substantially the same electric potential.

18. The magnetoresistive head according to claim 17, wherein said first magnetic yoke member and said second magnetic yoke member are grounded.

19. A magnetoresistive head comprising:
    a magnetic yoke defining a magnetic gap for guiding a signal magnetic field from a recording medium at an air-bearing surface;
    a giant magnetoresistive element magnetically coupled with said magnetic yoke at a position remote from the air-bearing surface, said giant magnetoresistive element comprising a granular magnetic film having a structure in which magnetic grains are dispersed in a non-magnetic matrix; and
    electrodes for supplying a sense current in a direction perpendicular to a film surface of said giant magnetoresistive element, one of said electrodes being formed on said giant magnetoresistive element and another of said electrodes consisting of said magnetic yoke.

20. The magnetoresistive head according to claim 19, wherein said non-magnetic matrix is made of a semiconductor or an insulator.

21. The magnetoresistive head according to claim 19, wherein the granular magnetic film, a magnetization fixed layer and an antiferromagnetic film are formed on said magnetic yoke.

22. The magnetoresistive head according to claim 21, wherein the magnetization of the magnetic grains in the granular magnetic film in the region near the magnetization fixed layer is fixed, and the magnetization of the magnetic grains in the granular magnetic film in the region near the magnetization yoke is rotated in accordance with a signal magnetic field.

23. The magnetoresistive head according to claim 19, wherein a thickness direction of said magnetic yoke is substantially the same as the recording track direction of a recording medium.

24. The magnetoresistive head according to claim 19, wherein said magnetic yoke comprising:
    a major surface substantially forming a single plane and comprising a first magnetic yoke member, a second magnetic yoke member, and a magnetic gap located between said first and second magnetic yoke members; and
    a medium facing surface substantially perpendicular to and adjacent to said major surface and containing said first magnetic yoke member, said second magnetic yoke member and said magnetic gap.

25. The magnetoresistive head according to claim 24, wherein said first magnetic yoke member and said second magnetic yoke member have substantially the same electric potential.

26. The magnetoresistive head according to claim 25, wherein said first magnetic yoke member and said second magnetic yoke member are grounded.

27. A magnetoresistive head comprising:
    a magnetic yoke defining a magnetic gap for guiding a signal magnetic field from a recording medium at an air-bearing surface;
    a giant magnetoresistive element magnetically coupled with said magnetic yoke at a position remote from the air-bearing surface, said giant magnetoresistive element comprising a stacked structure of a field detection layer, a non-magnetic layer made of a semiconductor or an insulator, and a magnetization fixed layer; and
    electrodes for supplying a sense current in a direction perpendicular to a film surface of said giant magnetoresistive element, one of said electrodes being formed on said giant magnetoresistive element and another of said electrodes consisting of said magnetic yoke.

28. The magnetoresistive head according to claim 27, wherein said magnetic yoke comprising:
    a major surface substantially forming a single plane and comprising a first magnetic yoke member, a second magnetic yoke member, and a magnetic gap located between said first and second magnetic yoke members; and
    a medium facing surface substantially perpendicular to and adjacent to said major surface and containing said first magnetic yoke member, said second magnetic yoke member and said magnetic gap.

29. The magnetoresistive head according to claim 28, wherein said first magnetic yoke member and said second magnetic yoke member have substantially the same electric potential.

30. The magnetoresistive head according to claim 29, wherein said first magnetic yoke member and said second magnetic yoke member are grounded.

31. The magnetoresistive head according to claim 27, wherein an antiferromagnetic layer is formed on the magnetization fixed layer.

32. The magnetoresistive head according to claim 27, wherein an insulator is formed on said magnetic yoke and wherein said field detection layer is formed on said insulator so as to cause magnetostatic coupling with the magnetic yoke.

33. The magnetoresistive head according to claim 27, wherein said field detection layer is formed directly on the magnetic yoke so as to cause exchange coupling with the magnetic yoke.

34. The magnetoresistive head according to claim 27, wherein the non-magnetic layer and the magnetization fixed layer is formed on the magnetic yoke, and the magnetic yoke functions as the field detection layer.

35. A hard disk drive comprising a magnetic recording medium and a magnetoresistive head, the magnetoresistive head comprising:

a magnetic yoke defining a magnetic gap for guiding a signal magnetic field from a recording medium at an air-bearing surface;

a giant magnetoresistive element formed on said magnetic yoke and magnetically coupled with said magnetic yoke at a position remote from the air-bearing surface; and electrodes for supplying a sense current in a direction perpendicular to a film surface of said giant magnetoresistive element, one of said electrodes being formed on said giant magnetoresistive element and another of said electrodes consisting of said magnetic yoke.

36. A hard disk drive comprising a magnetic recording medium and a magnetoresistive head, the magnetoresistive head comprising:

a magnetic yoke defining a magnetic gap for guiding a signal magnetic field from a recording medium at an air-bearing surface;

a giant magnetoresistive element magnetically coupled with said magnetic yoke at a position remote from the air-bearing surface, said giant magnetoresistive element comprising a granular magnetic film having a structure in which magnetic grains are dispersed in a non-magnetic matrix; and electrodes for supplying a sense current in a direction perpendicular to a film surface of said giant magnetoresistive element, one of said electrodes being formed on said giant magnetoresistive element and another of said electrodes consisting of said magnetic yoke.

37. A hard disk drive comprising a magnetic recording medium and a magnetoresistive head, the magnetoresistive head comprising:

a magnetic yoke defining a magnetic gap for guiding a signal magnetic field from a recording medium at an air-bearing surface;

a giant magnetoresistive element magnetically coupled with said magnetic yoke at a position remote from the air-bearing surface, said giant magnetoresistive element comprising a stacked structure of a field detection layer, a non-magnetic layer made of a semiconductor or an insulator, and a magnetization fixed layer; and electrodes for supplying a sense current in a direction perpendicular to a film surface of said giant magnetoresistive element, one of said electrodes being formed on said giant magnetoresistive element and another of said electrodes consisting of said magnetic yoke.

* * * * *